US012671199B2

(12) United States Patent
Muñoz Garcia et al.

(10) Patent No.: US 12,671,199 B2
(45) Date of Patent: Jun. 30, 2026

(54) ELECTRICAL ASSEMBLY AND HEADER

(71) Applicant: Lear Corporation, Southfield, MI (US)

(72) Inventors: Luis Miguel Muñoz Garcia, Valls (ES); Josep Maria Combalia, Valls (ES); Xavier Farre Vives, Valls (ES)

(73) Assignee: Lear Corporation, Southfield, MI (US)

( * ) Notice: Subject to any disclaimer, the term of this patent is extended or adjusted under 35 U.S.C. 154(b) by 318 days.

(21) Appl. No.: 18/135,470

(22) Filed: Apr. 17, 2023

(65) Prior Publication Data

US 2023/0361496 A1 Nov. 9, 2023

Related U.S. Application Data

(60) Provisional application No. 63/339,372, filed on May 6, 2022.

(51) Int. Cl.

| | |
|---|---|
| ***H01R 13/40*** | (2006.01) |
| ***H01R 12/58*** | (2011.01) |
| ***H01R 12/81*** | (2011.01) |
| ***H01R 43/20*** | (2006.01) |

(52) U.S. Cl.
CPC ............ *H01R 12/81* (2013.01); *H01R 12/58* (2013.01); *H01R 13/40* (2013.01); *H01R 43/20* (2013.01)

(58) Field of Classification Search
None
See application file for complete search history.

(56) References Cited

U.S. PATENT DOCUMENTS

| | | | | |
|---|---|---|---|---|
| 7,794,240 | B2 * | 9/2010 | Cohen | H01R 13/6471 439/78 |
| 11,121,488 | B2 * | 9/2021 | Kumar | H01R 4/24 |
| 2009/0042419 | A1 * | 2/2009 | Palomo | H01R 12/718 439/82 |
| 2012/0252232 | A1 * | 10/2012 | Buck | H01R 43/20 439/55 |
| 2013/0244506 | A1 * | 9/2013 | Endo | H01R 12/585 439/825 |
| 2016/0141776 | A1 * | 5/2016 | Eakins | H01R 4/028 228/248.1 |
| 2017/0155203 | A1 * | 6/2017 | Goto | H05K 1/184 |

* cited by examiner

*Primary Examiner* — Oscar C Jimenez
(74) *Attorney, Agent, or Firm* — Reising Ethington P.C.

(57) ABSTRACT

An electrical assembly may include a circuit board, a terminal header connected to the circuit board and including a plurality of aperture, and/or a plurality of electrical terminals connected to the terminal header. The plurality of electrical terminals may include a first electrical terminal having a first terminal configuration and/or a second electrical terminal having a second terminal configuration. The plurality of apertures may include a first aperture, a second aperture, and/or a third aperture. The first electrical terminal may include a first terminal first tail disposed at least partially in the first aperture. The second electrical terminal may include a second terminal first tail disposed at least partially in the second aperture. The second electrical terminal may include a second terminal second tail disposed at least partially in the third aperture.

20 Claims, 9 Drawing Sheets

ELECTRICAL ASSEMBLY AND HEADER

CROSS-REFERENCE TO RELATED APPLICATIONS

This application claims the benefit of and priority to U.S. Provisional Patent Application Ser. No. 63/339,372, filed on May 6, 2022, the disclosure of which is hereby incorporated by reference in its entirety as though fully set forth herein.

TECHNICAL FIELD

The present disclosure generally relates to electrical assemblies and headers, including electrical assemblies and header assemblies that may, for example, include and/or be connected to wiring harnesses and/or wiring harness connectors, such as for vehicle applications.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some designs may not be sufficiently adaptable or modular and/or may require significant redesign activities for even small changes. For example, some existing headers (e.g., terminal headers) may be compatible with only one connector terminal layout.

There is a desire for solutions/options that minimize or eliminate one or more challenges or shortcomings of electrical assemblies and headers. The foregoing discussion is intended only to illustrate examples of the present field and is not a disavowal of scope.

SUMMARY

In embodiments, an electrical assembly may include a circuit board, a terminal header connected to the circuit board and including a plurality of aperture, and/or a plurality of electrical terminals connected to the terminal header. The plurality of electrical terminals may include a first electrical terminal having a first terminal configuration and/or a second electrical terminal having a second terminal configuration. The plurality of apertures may include a first aperture, a second aperture, and/or a third aperture. The first electrical terminal may include a first terminal first tail disposed at least partially in the first aperture. The second electrical terminal may include a second terminal first tail disposed at least partially in the second aperture. The second electrical terminal may include a second terminal second tail disposed at least partially in the third aperture.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

Figure 1:
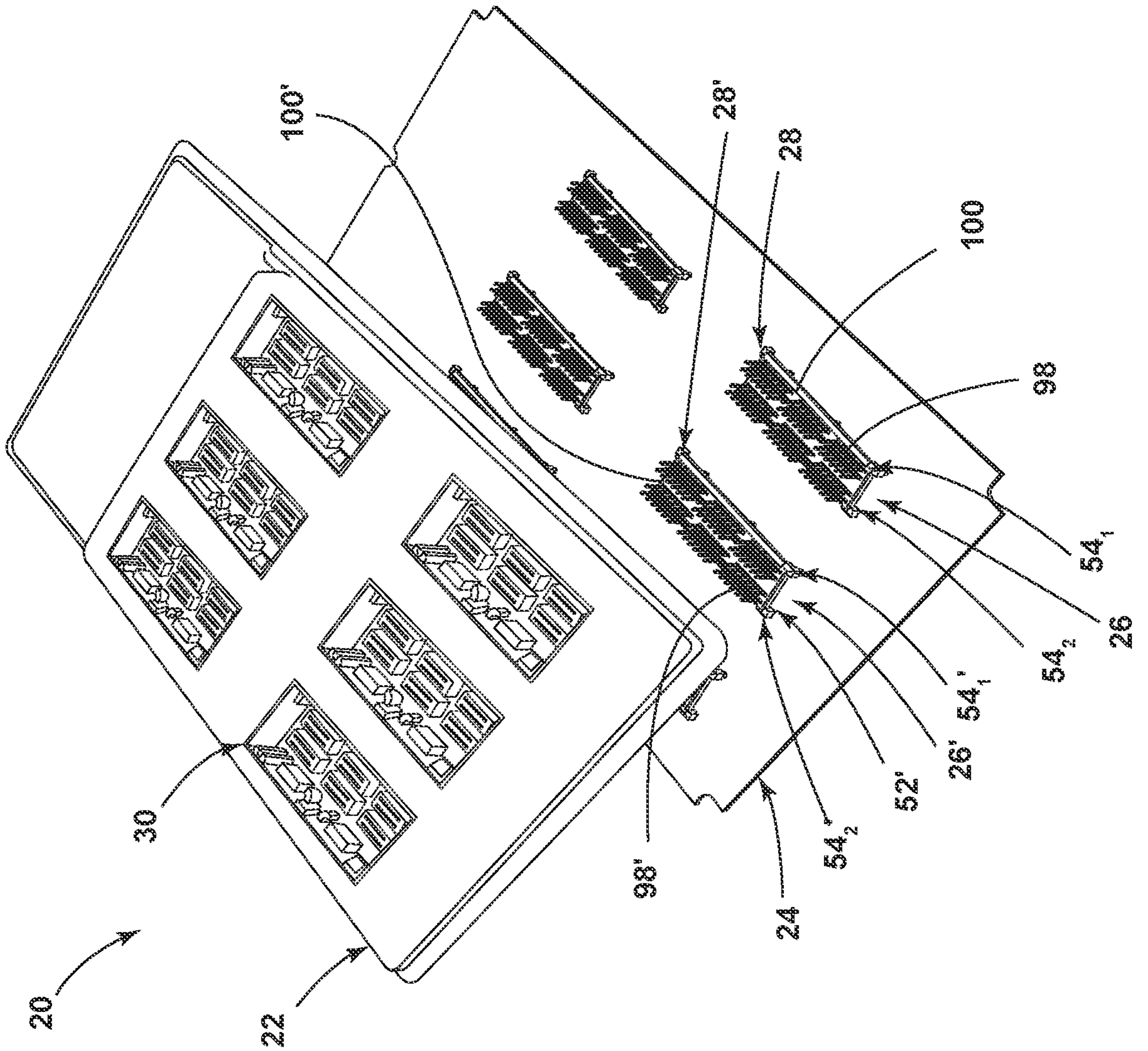
FIG. 1 is an exploded perspective view generally illustrating portions of an embodiment of an electrical assembly including a plurality of terminal headers connected to a circuit board according to teachings of the present disclosure.

In embodiments, such as generally illustrated in FIG. 1, an electrical assembly 20 may include a housing 22, a circuit board 24, one or more terminal headers 26, and/or a plurality of electrical terminals 28. The housing 22 may be configured to at least partially cover and/or house the circuit board 24 and/or one or more components connected thereto, such as the one or more terminal headers 26 and/or the plurality of electrical terminals 28. The housing 22 may, in some configurations, be configured for connection with one or more electrical connectors 40 (see, e.g., FIGS. 2A-2C). For example, a housing 22 may include one or more connector receptacles 30 that may be formed in in a top surface of the housing 22 and/or that may be configured to facilitate electrical connection between the one or more electrical connectors 40 and the circuit board 24.

Figure 2A:
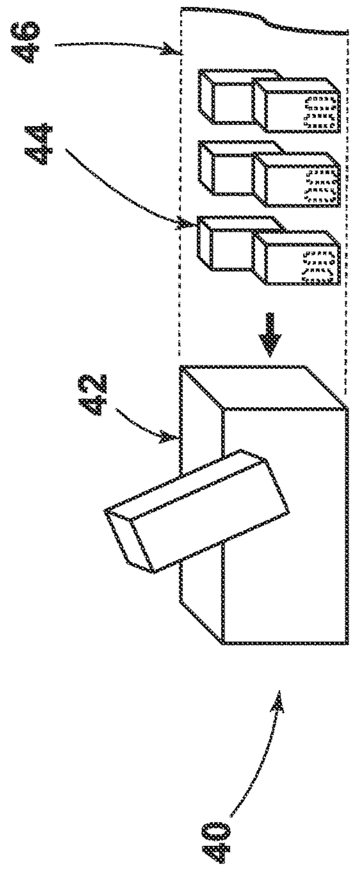
FIGS. 2A-2C are exploded perspective views generally illustrating embodiments of electrical connectors.
Figure 2B:
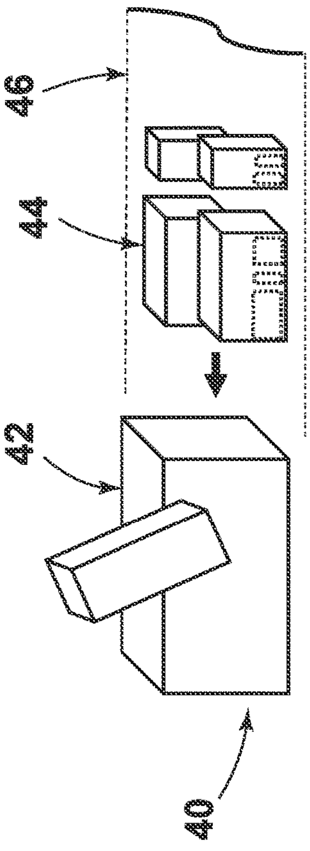
Figure 2C:
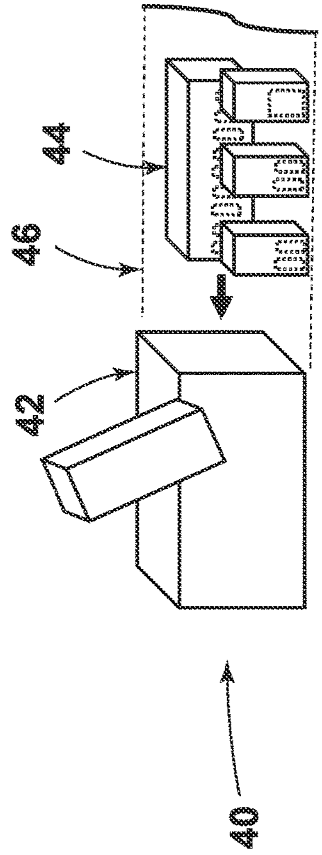

With embodiments, such as generally illustrated in FIGS. 2A-2C, an electrical connector 40 may include one or more of a variety of configurations. For example, an electrical connector 40 may include a housing 42 and one or more terminal modules 44 that may be connected to and/or disposed at least partially in the housing 42. The terminal modules 44 may be arranged in different configurations for different applications, such as for different configurations of wiring harnesses 46 that may be connected to and/or include the connector(s) 40. In some instances, an electrical connector 40 may include a commercially available connector or component. Electrical connectors 40 may have housings 42 that have a common configuration and may have different internal configurations, such as according to the arrangement of terminal modules 44. A common configuration may include connectors 40 that are designed to be the same and may differ insignificantly, such as within manufacturing tolerances.

Figure 3:
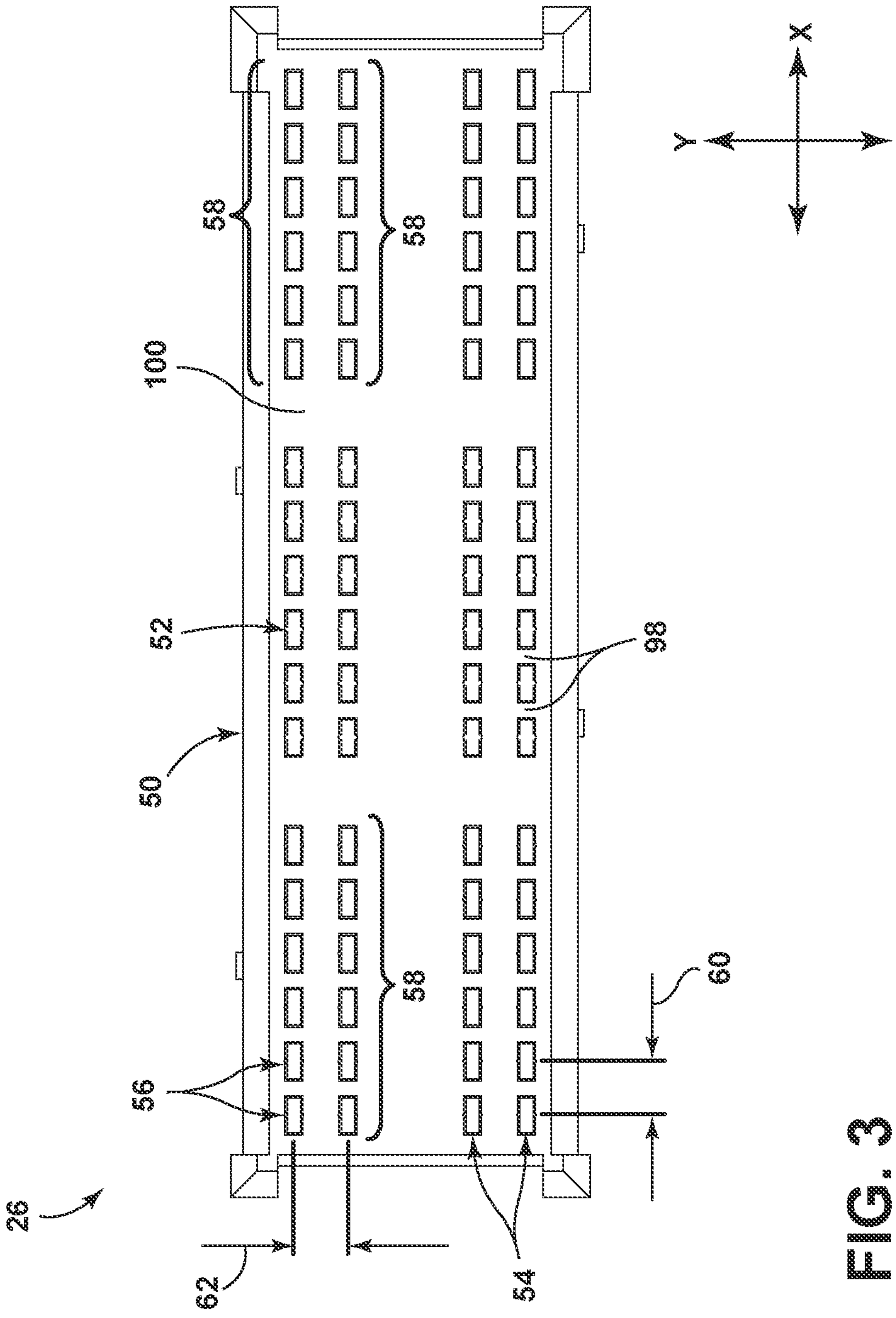
FIG. 3 is a top view generally illustrating an embodiment of a terminal header according to teachings of the present disclosure.

In embodiments, such as generally illustrated in FIG. 3, a terminal header 26 may include a body 50 and/or a plurality of apertures 52. The apertures 52 may extend through the body 50 (e.g., may include through holes). The apertures 52 may be disposed in a plurality of rows 54 and/or a plurality of columns 56. The rows 54 may include groups 58 of apertures 52 that are separated by a common distance 60 (e.g., the same center-to-center distance). The common distance 60 may, for example and without limitation, be 2.54 mm in one embodiment. With some embodiments, the apertures 52 may include a common configuration/size. For example, the apertures 52 may include the same length (e.g., in an X-direction) and/or width (e.g., in a Y-direction). In some instances, adjacent rows 54 may be separated by a distance 62 (e.g., in a Y-direction). The distance 62 may, in some examples, be the same as the distance 60.

Figure 4C:
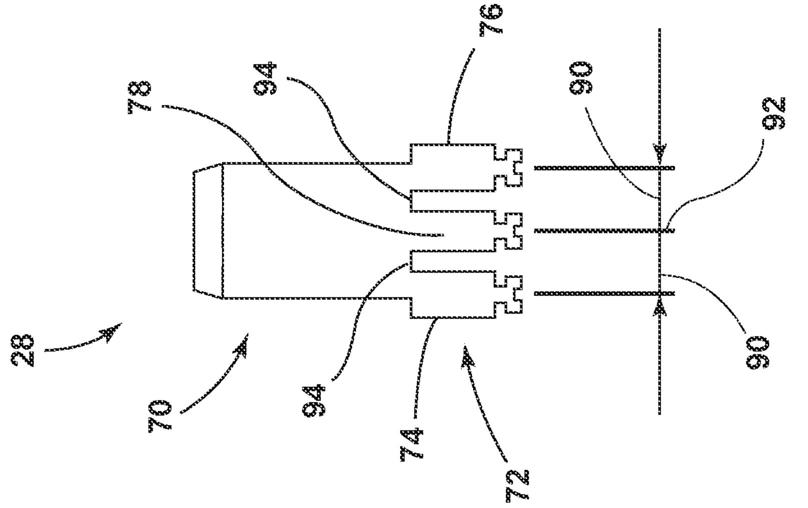
FIGS. 4A-4C are front views generally illustrating embodiments of electrical terminals having a first terminal configuration, a second terminal configuration, and a third terminal configuration, respectively, according to teachings of the present disclosure.
Figure 4B:
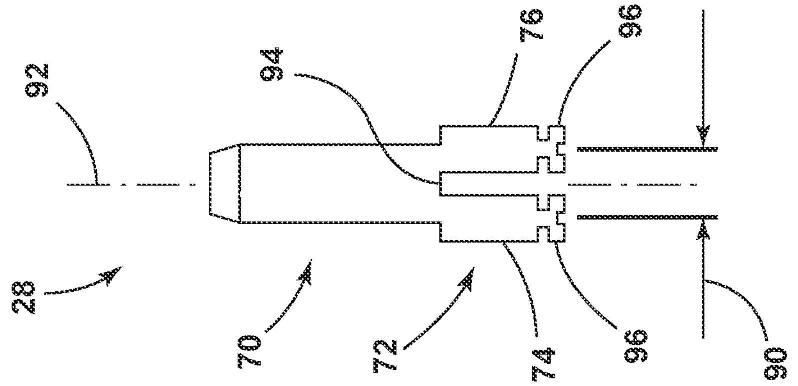
Figure 4A:
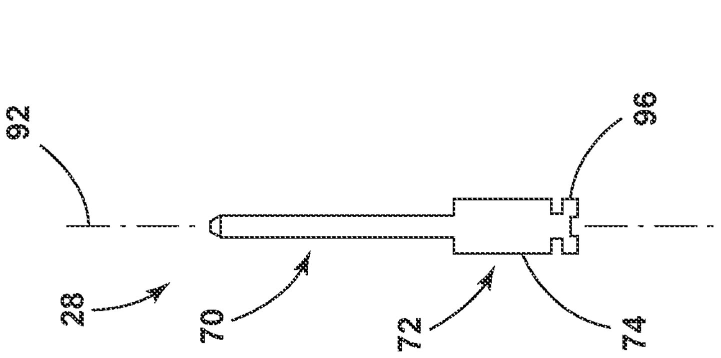

With embodiments, such as generally illustrated in FIGS. 4A-4C, electrical terminals 28 may include a first portion 70 and/or a second portion 72. The first portion 70 may be configured for a first electrical connection, such as with an electrical connector 40. For example, a first portion 70 may include a pin or blade configuration. A second portion 72 may be configured to a second electrical connection, such as with a circuit board 24. A second portion 72 may include one or more tails, such as a first tail 74, a second tail 76, and/or a third tail 78. Electrical terminals 28 may include a plurality of configurations, such as a first configuration (see, e.g., FIG. 4A), a second configuration (see, e.g., FIG. 4B), a third configuration (see, e.g., FIG. 4C), and/or other configurations. The first configuration may, for example, include a first portion 70 configured as a pin and/or a second portion 72 including a first tail 74. The second configuration may, for example, include a first portion 70 configured as a blade and/or a second portion 72 including a first tail 74 and a second tail 76. The third configuration may, for example, include a first portion 70 configured as a blade, which may be wider than the blade in the second configuration, and/or a second portion 72 including a first tail 74, a second tail 76, and a third tail 78. In an example, a width of a first portion 70 of a terminal 28 having the first configuration may be about 0.635 mm, a width of a first portion 70 of a terminal 28 having the second configuration may be about 2.8 mm, and/or a width of a first portion 70 of a terminal 28 having the third configuration may be about 5.2 mm, but embodiments are not limited to these values.

In embodiments, electrical terminals 28 may have a plurality of tails 74-78, such as with the second configuration and/or the third configuration. The tails 74-78 may be separated by a common distance 90 (e.g., the same center-to-center distance). For example, a first tail 74 may be separated from a second tail 76 by the distance 90, and/or a second tail 76 and a third tail 78 may be separate by the distance 90. The distance 90 may correspond to the distance 60 between apertures 52. In some configurations, the distances 60, 90 may be substantially the same (e.g., within manufacturing tolerances). The distance 90 may, for example and without limitation, be 2.54 mm.

With embodiments, a tail 74-78 may include one or more of a variety of configurations. For example and without limitation, a tail 74-78 may be rectangular and may extend away from the first portion 70. For electrical terminals 28 with a plurality of tails 74-78, the tails 74-78 may be parallel to each other. With the second configuration and/or the third configuration, the tails 74, 76 may be disposed at opposite sides of a centerline 92 of the terminal 28. With the third configuration, the third tail 78 may be disposed between the first tail 74 and the second tail 76, and/or may be aligned with the centerline 92.

Figure 5:
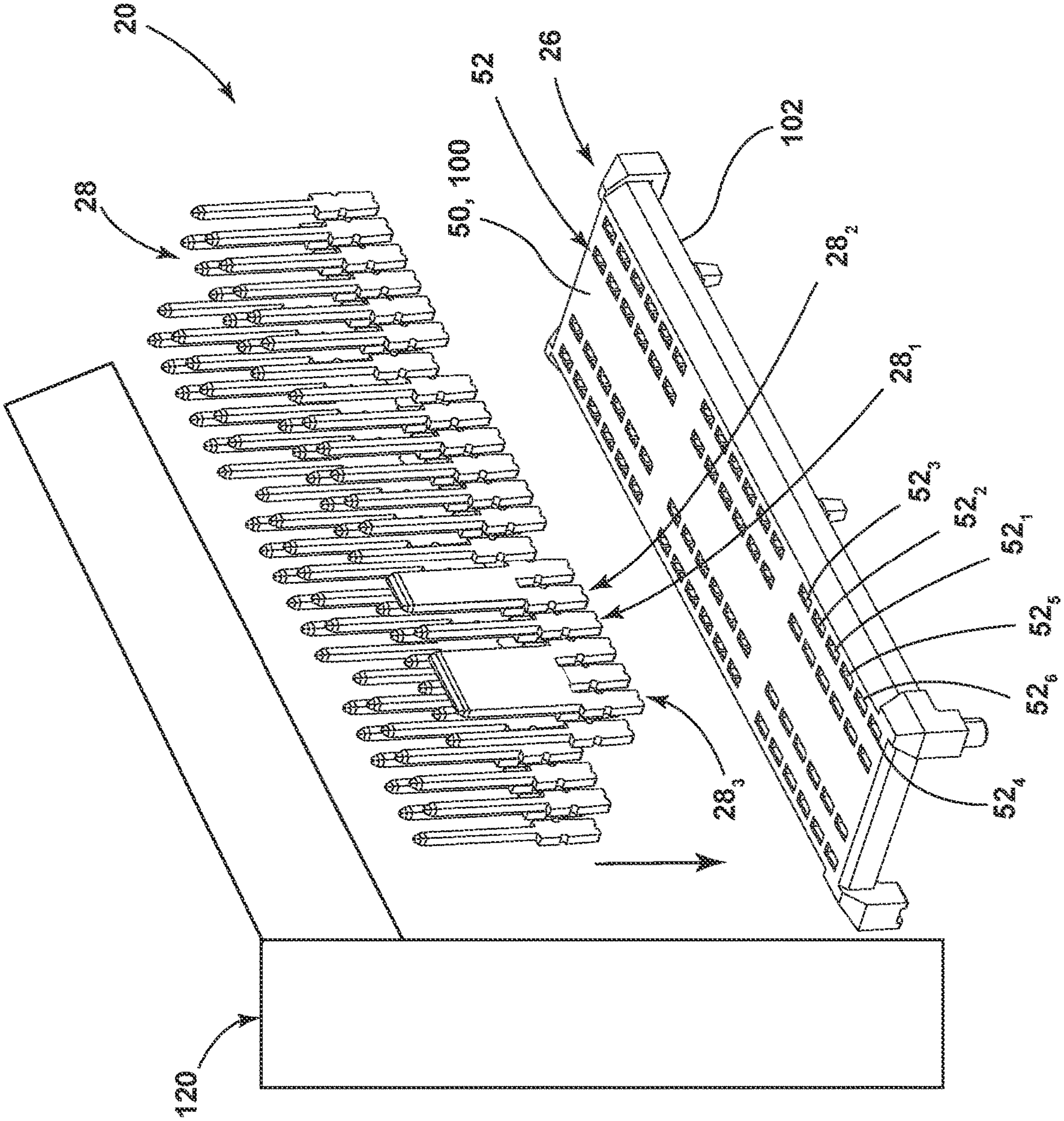
FIG. 5 is a perspective view generally illustrating embodiments of electrical terminals and a terminal header according to teachings of the present disclosure.
Figure 6:
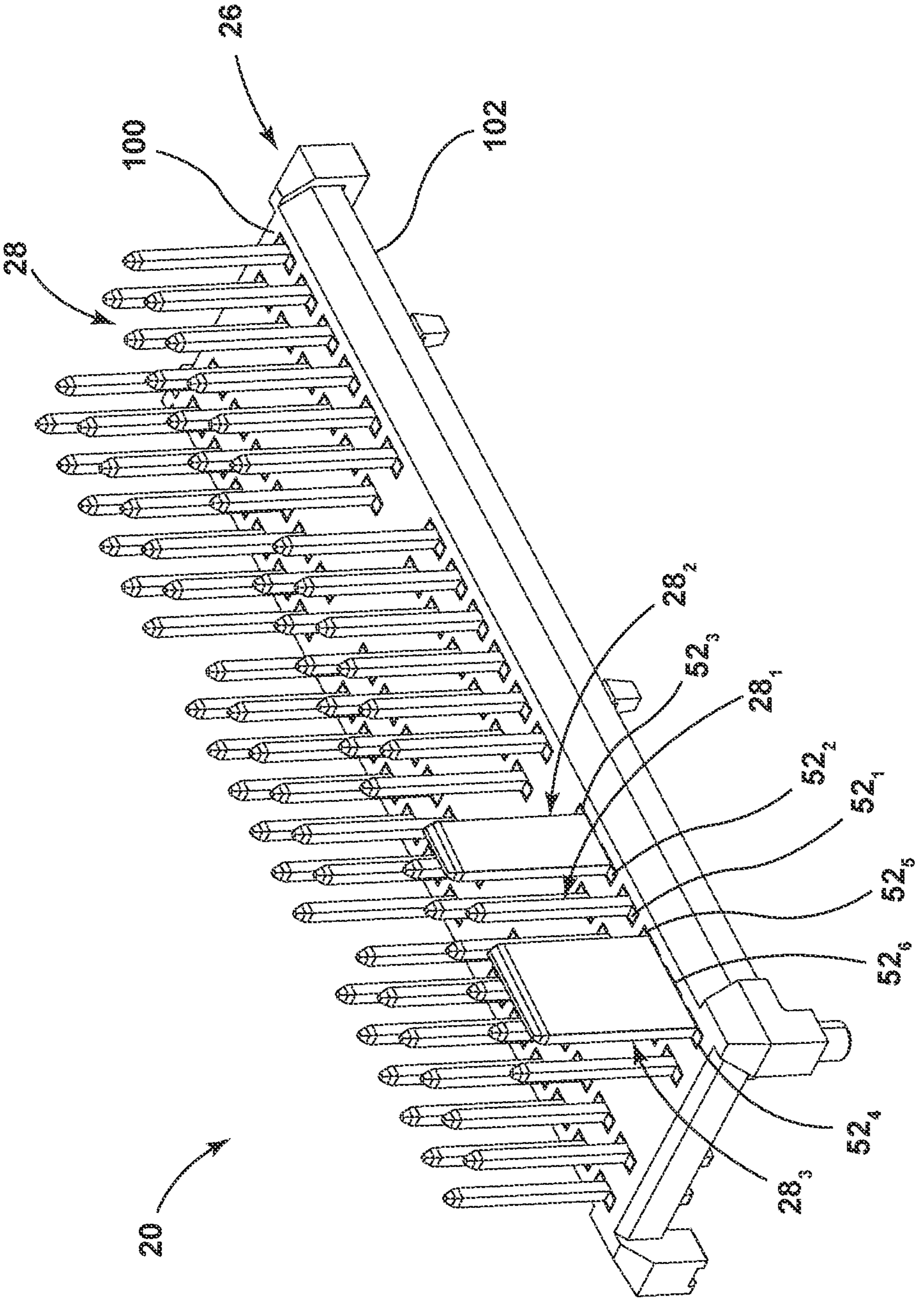
FIG. 6 is a perspective view generally illustrating embodiments of electrical terminals connected to an embodiment of a terminal header according to teachings of the present disclosure.
Figure 7:
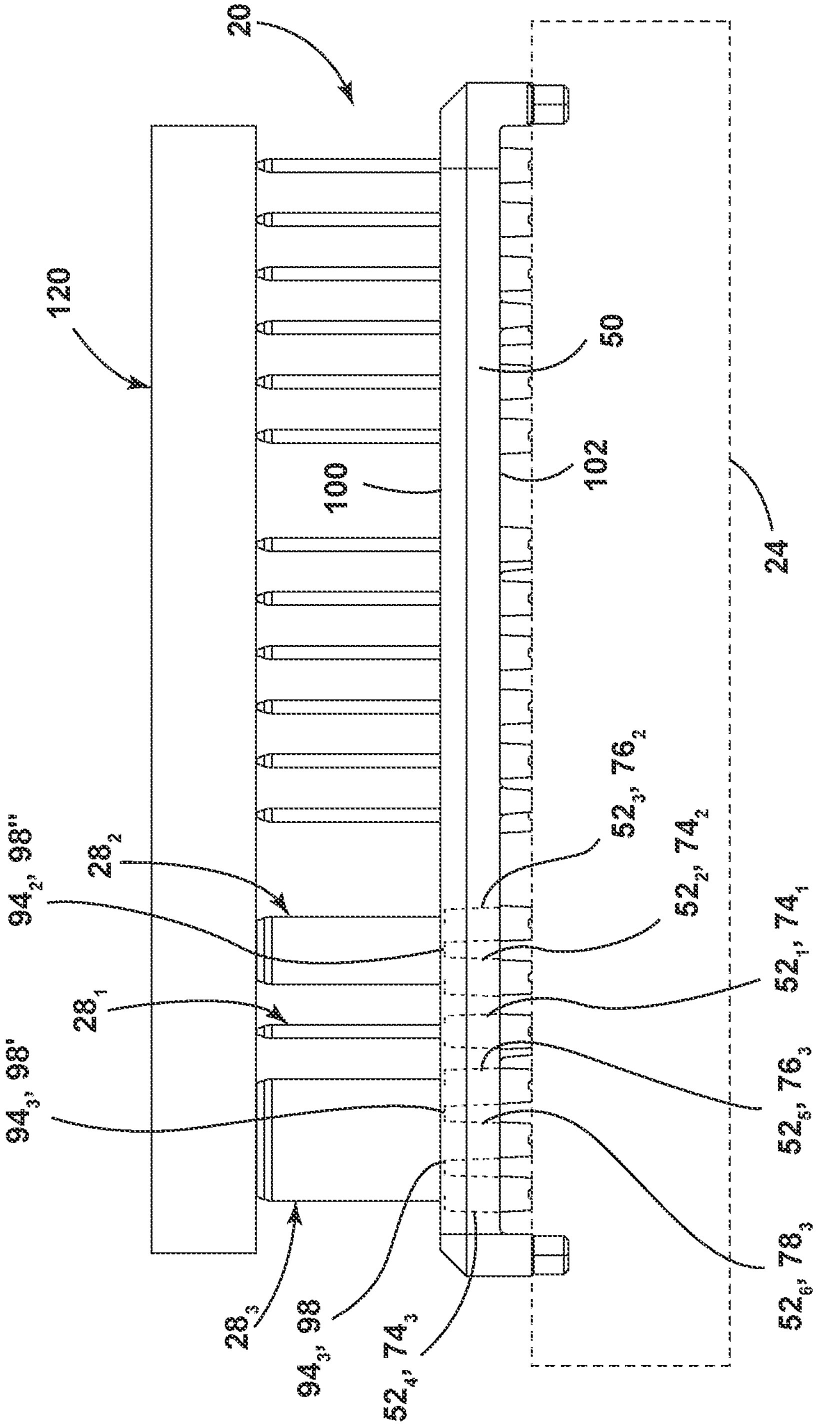
FIG. 7 is a side view generally illustrating embodiments of an insertion machine and of electrical terminals connected to an embodiment of a terminal header according to teachings of the present disclosure.

In embodiments, such as generally illustrated in FIGS. 5-7, a plurality of electrical terminals 28 may be configured for connection with a terminal header 26. Connecting the electrical terminals 28 with the terminal header 26 may include inserting the electrical terminals 28 from a top side 100 of the terminal header 26. The top side 100 may be opposite a bottom side 102 that may face the circuit board 24 in an assembled configuration. The electrical terminals 28 may, for example, be inserted by a terminal insertion machine 120 (see, e.g., FIGS. 5 and 7), which may include a robot and/or a press.

In embodiments, such as generally illustrated in FIGS. 4B, 4C, and 7, a terminal 28 may include a portion 94 (e.g., a ledge, lip, edge, etc.) that may be configured to limit an insertion depth of a terminal 28 into a terminal header 26. The portion 94 may be aligned with a gap between a pair of tails, such as a gap between first and second tails 74, 76, and/or a gap between second and third tails 76, 78 (e.g., a terminal 28 having the third configuration may have two portions 94). The portion(s) 94 may, in an assembled/inserted configuration, be disposed in contact with a top surface of the terminal header 26, such as with portions or lands 98 between adjacent apertures 52.

In some examples, such as in connection with a terminal 28 having a first configuration (see, e.g., FIG. 4A), insertion depth and/or proper placement of a terminal 28 may be facilitated externally. For example and without limitation, a terminal insertion machine 120 (see, e.g., FIG. 5) may automatically limit insertion depth (e.g., via insertion time) and/or may include a stop that a tail 74-78 (or a foot 96 thereof) may contact when insertion is complete.

In some embodiments, a tail 74-78 may include a foot 96 disposed at a distal end of the tail 74-78. A foot 96 may be configured for soldering with the circuit board 24, such as for a surface mount configuration. In other configurations, a foot 96 may extend into and/or through a circuit board 24, such as for a through hole configuration.

With embodiments, such as generally illustrated in FIG. 7, an electrical assembly 20 may include a first terminal 281 having a first configuration and a first terminal first tail 741 disposed at least partially in a first aperture 521 of the terminal header 26. A second terminal 282 may have a second configuration, a second terminal first tail 742 disposed at least partially in a second aperture 522 of the terminal header 26, and/or a second terminal second tail 762 disposed at least partially in a third aperture 523 of the terminal header 26. A third terminal 283 may have a third configuration, a third terminal first tail 743 disposed at least partially in a fourth aperture 524 of the terminal header 26, a third terminal second tail 763 disposed at least partially in a fifth aperture 525 of the terminal header 26, and/or a third terminal third tail 783 disposed at least partially in a sixth aperture 526 of the terminal header 26. In examples, some or all of the apertures 521-6 may have a common size (e.g., the same width and/or length). Some or all of the tails 741-3, 762-3, 783 may have a common size (e.g., the same width and/or thickness).

Figure 8C:
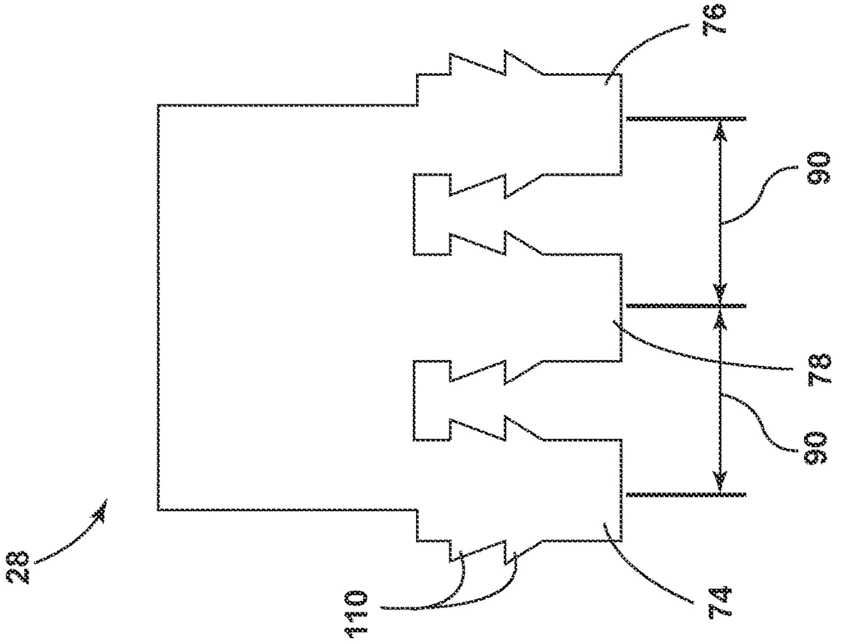
FIGS. 8A-8C are front views generally illustrating embodiments of electrical terminals having a first terminal configuration, a second terminal configuration, and a third terminal configuration, respectively, according to teachings of the present disclosure.
Figure 8B:
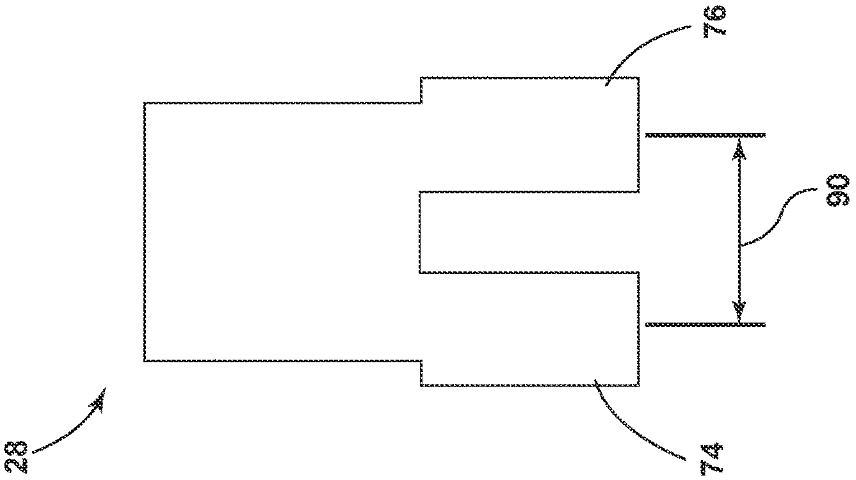
Figure 8A:
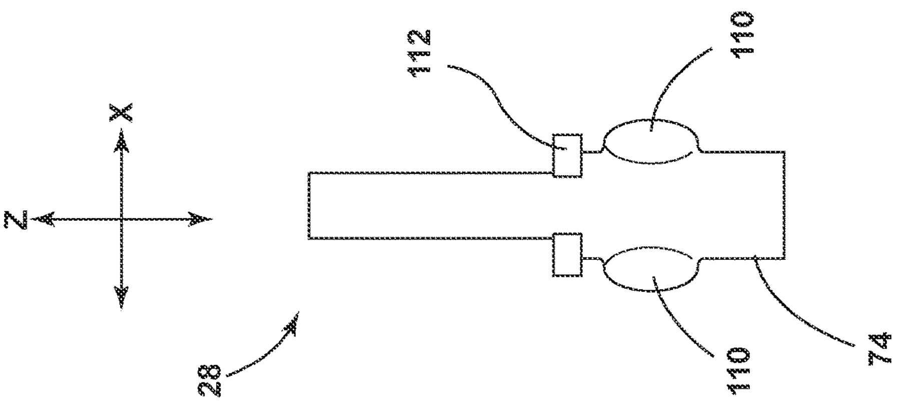

In embodiments, such as generally illustrated in FIGS. 8A-8C, tails 74-78 of an electrical terminal 28 may be configured to facilitate retention relative to the terminal header 26. For example, a tail 74-78 of a terminal 28 may include one or more protrusions 110 that may extend outward from the tail 74-78, such as to increase friction between the tail 74-78 and the terminal header 26. The protrusions 110 may, for example, include a rounded configuration, such as generally illustrated in FIG. 8A. Additionally or alternatively, protrusions 110 may include toothed configurations that may taper such that the width of the tail 74-78 increases toward the first portion 70, such as generally illustrated in FIG. 8C. The protrusions may increase a width (e.g., in an X-direction) of a terminal 28. For example and without limitation, a maximum width of a tail 74-78 without a protrusion 110 may be about 1.6 mm, and a width of a tail 74-78 with protrusions 110 on both sides may be about 2.7 mm.

With some embodiments, such as generally illustrated in FIG. 8A, a terminal 28 may include a shoulder 112 that may be configured to limit an insertion depth of the terminal 28 into a terminal header 26. The shoulder 112 may extend outward from one or more sides of the terminal 28, such as at or about a middle of a terminal 28 (e.g., a bottom of the first portion 70 and/or a top of the second portion 72).

Figure 9C:
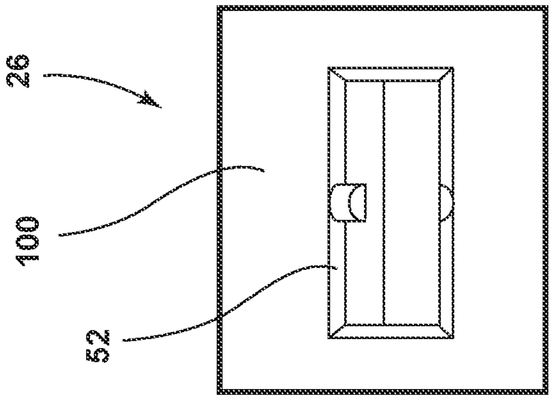
FIGS. 9A-9C are top views generally illustrating embodiments of apertures of a terminal header according to teachings of the present disclosure.
Figure 9B:
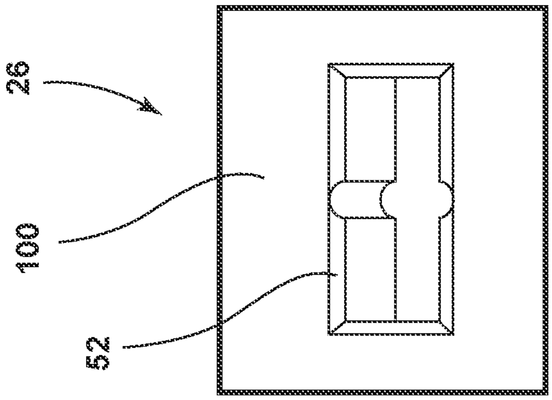
Figure 9A:
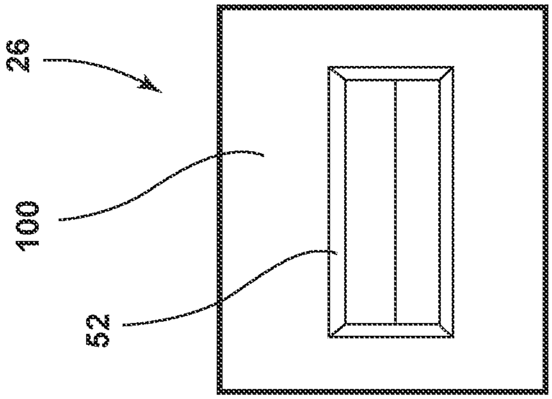

With embodiments, such as generally illustrated in FIGS. 9A-9C, apertures 52 of a terminal header 26 may include tapered top portions, which may facilitate insertion of electrical terminals 28 and/or tails 74-78 thereof, such as from a top side 100 of the terminal header 26.

In embodiments, a plurality of electrical terminals 28 may be connected to the terminal header 26 in a first arrangement. A second plurality of electrical terminals 28' may be connected to the second terminal header 26' in a second arrangement that may be different than the first arrangement. For example and without limitation, the first arrangement may correspond to a first connector configuration of a first electrical connector 40, and/or the second arrangement may correspond to a second connector configuration of a second electrical connector 40 that may be different than the first connector configuration. An arrangement of electrical terminals 28 may include which electrical terminals 28 of the first configuration, second configuration, and/or third configuration are connected to which apertures 52 of a terminal header 26. A first arrangement may, for example and without limitation, include a row with electrical terminals 28 all having the first configuration (see, e.g., row 541 of terminal header 26). A second arrangement may, for example and without limitation, include a row with electrical terminals 28' having the first configuration and electrical terminals 28' having the second configuration (see, e.g., row 541' of the second terminal header 26'). The first arrangement and the second arrangement may not be completely different, in some instances. For example, the first arrangement and the second arrangement may each include a row with electrical terminals 28, 28' having the first configuration and electrical terminals 28, 28' having the third configuration (see, e.g., rows 542 and 542').

With embodiments, such as generally illustrated in FIGS. 6 and 7, a terminal header 26 may include a plurality of lands 98 that may be disposed between respective apertures 52. For example and without limitation, a top surface/side 100 of a terminal header 26 may include a land 98 between a fourth aperture 524 and a fifth aperture 525, and/or may include an additional land 98' between the fifth aperture 525 and the sixth aperture 526. In an assembled configuration, a terminal 28 (e.g., terminal 283) may be disposed in contact with the land 98 and the additional land 98' (see, e.g., FIG. 7). For example, portions 943 of the third terminal 283 may be in contact with the lands 98, 98' in an assembled configuration. Additionally or alternatively, a portion 942 of a second terminal 282 may be in contact with a land 98" in an assembled configuration.

With embodiments, such as generally illustrated in FIGS. 6 and 7, a terminal header 28 may include a plurality of lands 98 that may be disposed between respective apertures 52. For example and without limitation, a top surface/side 100 of a terminal header 28 may include a land 98 between a fourth aperture 524 and a fifth aperture 525, and/or may include an additional land 98' between the fifth aperture 525 and the sixth aperture 526. In an assembled configuration, a terminal 28 (e.g., terminal 283) may be disposed in contact with the land 98 and the additional land 98' (see, e.g., FIG. 7). For example, portions 943 of the third terminal 283 may be in contact with the lands 98, 98' in an assembled configuration. Additionally or alternatively, a portion 942 of a second terminal 282 may be in contact with a land 98" in an assembled configuration.

In embodiments, some or each of the apertures 52 in some or each of the groups 58 of apertures 52 may be configured to receive a first terminal first tail 741. Some or each of the adjacent pairs of apertures 52 in some or each of the groups 58 of apertures 52 may configured to receive a second terminal first tail 742 and a second terminal second tail 762. Some or each of the sets of three adjacent apertures 52 in some or each of the groups 58 of apertures 52 may be configured to receive a third terminal first tail 743, a third terminal second tail 763, and a third terminal third tail 783.

Embodiments of electrical assemblies 20 may include modular configurations. For example, a plurality of electrical terminals 28 having different configurations may be connected in different ways to the same terminal header 26, such as for connection with electrical connectors 40 having different configurations. In some instances, the same terminal header configuration may be compatible with a variety of connectors 40 of a connector family, such as connectors 40 with the same configuration of a housing 42 and different terminal modules 44.

In embodiments, a method of assembling the electrical assembly 20 may include connecting the plurality of electrical terminals 28 with the terminal header 26 and/or connecting the terminal header 26 to a circuit board 24 such that a bottom side 102 of the terminal header 26 faces the circuit board 24. Connecting the plurality of electrical terminals 28 with the terminal header 26 may include inserting a first terminal first tail 741 of a first terminal 281 into a first aperture 521, inserting, from a top side 100 of the terminal header 26, a second terminal first tail 742 of a second terminal 282 into the second aperture 522, and/or inserting, from the top side 100 of the terminal header 26, a second terminal second tail 762 of the second terminal 282 into a third aperture 523. A portion 94 that may connect the tails 742, 762 may limit an insertion depth of the second terminal 282 and/or tails 742, 762 into the terminal header 26

In embodiments, connecting the plurality of electrical terminals 28 with the terminal header 26 may include inserting, from a top side 100 of the terminal header 26, a third terminal first tail 743 of a third terminal 283 into a fourth aperture 524, inserting, from a top side 100 of the terminal header 26, a third terminal second tail 763 of the third terminal 283 into the fifth aperture 525, and/or inserting, from the top side 100 of the terminal header 26, a third terminal third tail 783 of the third terminal 283 into a sixth aperture 526.

In embodiments, connecting the plurality of electrical terminals 28 with the terminal header 26 may include inserting, from a top side 100 of the terminal header 26, a third terminal first tail 743 of a third terminal 283 into a fourth aperture 524, inserting, from a top side 100 of the terminal header 26, a third terminal second tail 763 of the third terminal 283 into the fifth aperture 525, and/or inserting, from the top side 100 of the terminal header 28, a third terminal third tail 783 of the third terminal 283 into a third aperture 523.

With embodiments, the method may include inserting a second plurality of electrical terminals 28' into a second terminal header 26', and/or connecting the second terminal header 26' to the circuit board 24. The terminal header 26 and the second terminal header 26' may have a common header configuration (e.g., may be substantially the same) and/or may be separate unitary/monolithic components. Connecting a terminal header 26 to a circuit board 24 may include electrically connecting a plurality of electrical terminals 28 with the circuit board 24 and/or inserting one or more portions of the terminal header 26 into the circuit board 24.

Any dimensions shown in the drawings, such as in FIGS. 8A-8C, are examples only, and embodiments are not limited to those dimensions.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

The invention claimed is:

1. An electrical assembly, comprising:

a circuit board;

a terminal header connected to the circuit board and including a plurality of apertures;

a plurality of electrical terminals connected to the terminal header and including a first electrical terminal comprising a first terminal configuration and a second electrical terminal comprising a second terminal configuration, wherein the plurality of apertures includes a first aperture, a second aperture, and a third aperture, the first electrical terminal includes a first terminal first tail disposed at least partially in the first aperture, the second electrical terminal includes a second terminal first tail disposed at least partially in the second aperture, the second electrical terminal includes a second terminal second tail disposed at least partially in the third aperture, and each aperture of the plurality of apertures is to receive each of the first terminal configuration and the second terminal configuration, and wherein each aperture is to receive any of:

the first terminal first tail, the second terminal first tail, and the second terminal second tail.

2. The electrical assembly of claim 1, wherein the first aperture, the second aperture, and the third aperture comprise a common aperture configuration.

3. The electrical assembly of claim 1, wherein the first terminal first tail, the second terminal first tail, and the second terminal second tail comprise common widths and thicknesses.

4. The electrical assembly of claim 1, including a third electrical terminal comprising a third configuration including a third terminal first tail, a third terminal second tail, and a third terminal third tail, wherein the plurality of apertures includes a fourth aperture, a fifth aperture, and a sixth aperture, the third terminal first tail is disposed at least partially in the fourth aperture, the third terminal second tail is disposed at least partially in the fifth aperture, and the third terminal third tail is disposed at least partially in the sixth aperture.

5. The electrical assembly of claim 4, wherein the first aperture, the second aperture, the third aperture, the fourth aperture, the fifth aperture, and the sixth aperture have a common size.

6. The electrical assembly of claim 4, wherein the first terminal first tail, the second terminal first tail, the second terminal second tail, the third terminal first tail, the third terminal second tail, and the third terminal third tail comprise a common width and thickness.

7. The electrical assembly of claim 4, wherein the terminal header includes a land disposed between the fourth aperture and the fifth aperture and an additional land disposed between the fifth aperture and the sixth aperture, and the third electrical terminal is disposed on the land and the additional land.

8. The electrical assembly of claim 4, wherein the plurality of apertures is disposed in a plurality of rows, each row of the plurality of rows includes one or more groups of apertures separated by a common distance, each aperture in each group of apertures is configured to receive the first terminal first tail, each adjacent pair of apertures in each group of apertures is configured to receive the second terminal first tail and the second terminal second tail, and each set of three adjacent apertures in each group of apertures is configured to receive the third terminal first tail, the third terminal second tail, and the third terminal third tail.

9. The electrical assembly of claim 4, wherein (i) the second terminal first tail and the second terminal second tail, (ii) the third terminal first tail and the third terminal second tail, and (iii) the third terminal second tail and the third terminal third tail are separated by a common distance.

10. The electrical assembly of claim 1, wherein a distance between the second terminal first tail and the second terminal second tail corresponds to an aperture separation distance between the second aperture and the third aperture.

11. The electrical assembly of claim 1, wherein the plurality of apertures is disposed in a plurality of rows, each row of the plurality of rows includes one or more groups of apertures separated by a common distance, each aperture in each group of apertures is configured to receive the first terminal first tail, and each adjacent pair of apertures in each group of apertures is configured to receive the second terminal first tail and the second terminal second tail.

12. The electrical assembly of claim 1, wherein the second electrical terminal is disposed on a portion of a top surface the terminal header disposed between the second aperture and the third aperture.

13. The electrical assembly of claim 1, including:

a second terminal header connected to the circuit board and a second plurality of apertures, a second plurality of electrical terminals, wherein the terminal header and the second terminal header have a common header configuration, the plurality of electrical terminals are connected to the terminal header in a first configuration, and the second plurality of electrical terminals are connected to the second terminal header in a second configuration that is different than the first configuration.

14. The electrical assembly of claim 13, wherein the first configuration corresponds to a first electrical connector, and the second configuration corresponds to a second electrical connector.

15. The electrical assembly of claim 14, wherein the first electrical connector and the second electrical connector comprise housings with a common housing configuration and have different internal configurations.

16. A method of assembling the electrical assembly of claim 1, comprising:

connecting the plurality of electrical terminals with the terminal header, including:

inserting the first terminal first tail into the first aperture;

inserting, from a top side of the terminal header, the second terminal first tail into the second aperture; and inserting, from the top side of the terminal header, the second terminal second tail into the third aperture; and connecting the terminal header to the circuit board such that a bottom side of the terminal header faces the circuit board.

17. The method of claim 16, wherein a portion of the second electrical terminal that connects the second terminal first tail with the second terminal second tail limits an insertion depth of the second terminal first tail and the second terminal second tail.

18. The method of claim 16, including inserting a second plurality of electrical terminals into a second terminal header; and connecting the second terminal header to the circuit board, wherein the terminal header and the second terminal header have a common header configuration.

19. The method of claim 18, wherein the second plurality of electrical terminals include terminals comprising the first terminal configuration and terminals comprising the second terminal configuration:

the plurality of electrical terminals is connected to the terminal header in a first arrangement; and the second plurality of electrical terminals is connected to the second terminal header in a second arrangement that is different than the first arrangement.

20. The method of claim 18, wherein terminal header and the second terminal header are separate monolithic components.

* * * * *